(12) United States Patent
Griffioen

(10) Patent No.: US 6,405,998 B1
(45) Date of Patent: Jun. 18, 2002

(54) METHOD FOR INSTALLING CABLES IN TUBES AND APPARATUS FOR PRACTICING THIS METHOD

(75) Inventor: Willem Griffioen, Ter Aar (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 09/509,070

(22) PCT Filed: Oct. 5, 1998

(86) PCT No.: PCT/NL98/00574

§ 371 (c)(1),
(2), (4) Date: May 15, 2000

(87) PCT Pub. No.: WO99/18465

PCT Pub. Date: Apr. 15, 1999

(30) Foreign Application Priority Data

Oct. 6, 1997 (NL) .............................................. 1007210

(51) Int. Cl.[7] .................................................. B66F 3/00
(52) U.S. Cl. .............................. 254/134.4; 254/134.3 R
(58) Field of Search ........................ 254/134.4, 134.3 R, 254/134.3 FT

(56) References Cited

U.S. PATENT DOCUMENTS

| | | | | |
|---|---|---|---|---|
| 4,185,809 A | * | 1/1980 | Jonnes | .................... 254/134.4 |
| 4,756,510 A | * | 7/1988 | Klamm et al. | ........... 254/134.4 |
| 4,810,429 A | * | 3/1989 | Mayr | |
| 5,143,353 A | * | 9/1992 | Sano et al. | ......... 254/134.3 FT |
| 5,456,450 A | * | 10/1995 | Reeve et al. | ............. 254/134.4 |
| 5,467,968 A | * | 11/1995 | Proud et al. | ............. 254/134.4 |
| 5,762,321 A | * | 6/1998 | Petersen et al. | ......... 254/134.4 |
| 5,992,250 A | * | 11/1999 | Kluth et al. | ............. 254/134.4 |

FOREIGN PATENT DOCUMENTS

| | | | | |
|---|---|---|---|---|
| EP | 2 255 686 A | * | 2/1988 | |
| EP | 2 292 037 A | * | 11/1988 | |
| GB | 2 122 367 A | * | 1/1984 | |

* cited by examiner

Primary Examiner—Joseph J. Hail, III
Assistant Examiner—Lee Wilson
(74) Attorney, Agent, or Firm—Frishauf, Holtz, Goodman, Langer & Chick, P.C.

(57) ABSTRACT

A method and apparatus for installing a cable in a tube is provided wherein the cable is installed by the combination of a pushing force and a pressurized fluid drag force. In particular, the pressurized fluid drag force is applied by alternately passing a first pressurized fluid having first hydrodynamic properties and a second pressurized fluid having second (different) hydrodynamic properties into the tube at substantially a same location.

28 Claims, 1 Drawing Sheet

METHOD FOR INSTALLING CABLES IN TUBES AND APPARATUS FOR PRACTICING THIS METHOD

BACKGROUND OF THE INVENTION

This invention relates to a method for installing cables in tubes, in which the cable is installed by the combination of a pushing force and the drag force of a fluid under pressure which is passed through the tube.

Such a method is known from EP-A-0 292 037.

The known technique has as an advantage that the forces propelling the cable are at least partly distributed over the length of the cable, so that, in practice, the cable can be installed over long distances, also in the case of winding paths. EP-A-0 292 037 discloses using a gas stream as fluid, while GB-B-2,122,367 describes the use of a liquid stream.

In the conventional installation of cables by pulling, the force is fully concentrated at the forward end of the cable and the installation in winding paths proceeds with considerably more difficulty.

When cables are to be installed in tubes of a diameter of a few millimeters in a winding path, installation using a gas under pressure is possible only to a certain tube length. One of the causes is that the cables adhere to the inner wall of the tube as a result of electrostatic charge arising, during propulsion, from the friction between the outer wall of the cable and the inner wall of the tube. This problem is partly solved by the use of a liquid instead of a gas, in that the cables float on the liquid. In the case of tubes of small diameters, however, the flow velocity of the liquid, and hence the speed of propulsion of the cable, becomes very low when longer installation lengths are involved. Installation times of many hours are no exception then. This obviously impedes efficient installation of the cables. In addition, the stiffness of the cable, in particular the stiffness in the forward end of the cable when passing through bends, plays an important role. This is true in particular if the cable just floats on the liquid.

SUMMARY OF THE INVENTION

The present invention contemplates a solution to the problems outlined and, to that end, provides a method of the above-mentioned kind, in which, during the installation, as fluid, alternately a first medium having first hydrodynamic properties is passed into the tube and at certain moments a second medium having second hydrodynamic properties.

According to the invention, a difference in hydrodynamic or flow properties is defined as follows: if a section of a flowing medium is considered separately and, in a specific tube having a pressure $p_1$ at the inlet end and a pressure $p_2$ at the other end, results in a different flow velocity than does a section of a second flowing medium in the same tube under the same conditions, different hydrodynamic properties are involved. This may involve different gases or different liquids having different viscosities and/or densities, or gases and liquids may be involved. What may also be involved is a gas or liquid in which sections of different temperatures, temperature pulses, are introduced and/or to which, in part, a for instance solid substance is added.

According to the invention, in a preferred embodiment, the first medium is a gas stream and the second medium is a liquid.

According to a second aspect of the invention, the liquid has a good electrical conductivity.

The measures according to the invention have the favorable influence elucidated hereinafter on the above-described problems of slow installation speed, cable stiffness and adhesion of the cable to the tube wall.

Since gases generally have a lower viscosity than liquids, the combination of a gas with a liquid will flow faster than the liquid alone. Surprisingly, by selecting as liquid a liquid of a sufficient electrical conductivity, the problem of cable adhesion to the tube wall is also solved, since any electrical charge produced will be immediately removed owing to the conductivity of the liquid. In this exemplary embodiment of the invention, in the tube in which a cable is being installed, alternately, gas will be present over a part of the tube length and a liquid over a next part. In such a situation, the greater pressure gradient is present in the part with the liquid, in that the viscosity of the liquid is higher than that of the gas. As a consequence, areas of different pressure gradients move through the tube, so that at certain moments the cable is subjected to a greater force, which, for instance, is just sufficient for the forward end of the cable to pass through a bend. Under certain circumstances, it is even possible for the cable to move through the tube making a "serpentine", movement, which further increases the attainable installation length.

The present invention further provides an apparatus for installing a cable in a tube, comprising a feeder unit with a feed-in opening for feeding in a cable end, at least two pressure rollers for engaging the cable to transport it from the feed-in end to the tube, a feed-out opening for the cable, to which feed-out opening the tube can be connected, and a supply opening for supplying a first medium having first hydrodynamic properties and a second medium having second hydrodynamic properties, and means for alternately supplying the first and the second medium via the feeder unit to the tube.

BRIEF DESCRIPTION OF THE DRAWINGS

The invention will be elucidated hereinbelow on the basis of exemplary embodiments, with reference to the drawings, in which:

FIG. 1b represents the course of the pressure p as a function of the tube length x, in the tube shown in FIG. 1a.

DETAILED DESCRIPTION

Figure 1A:
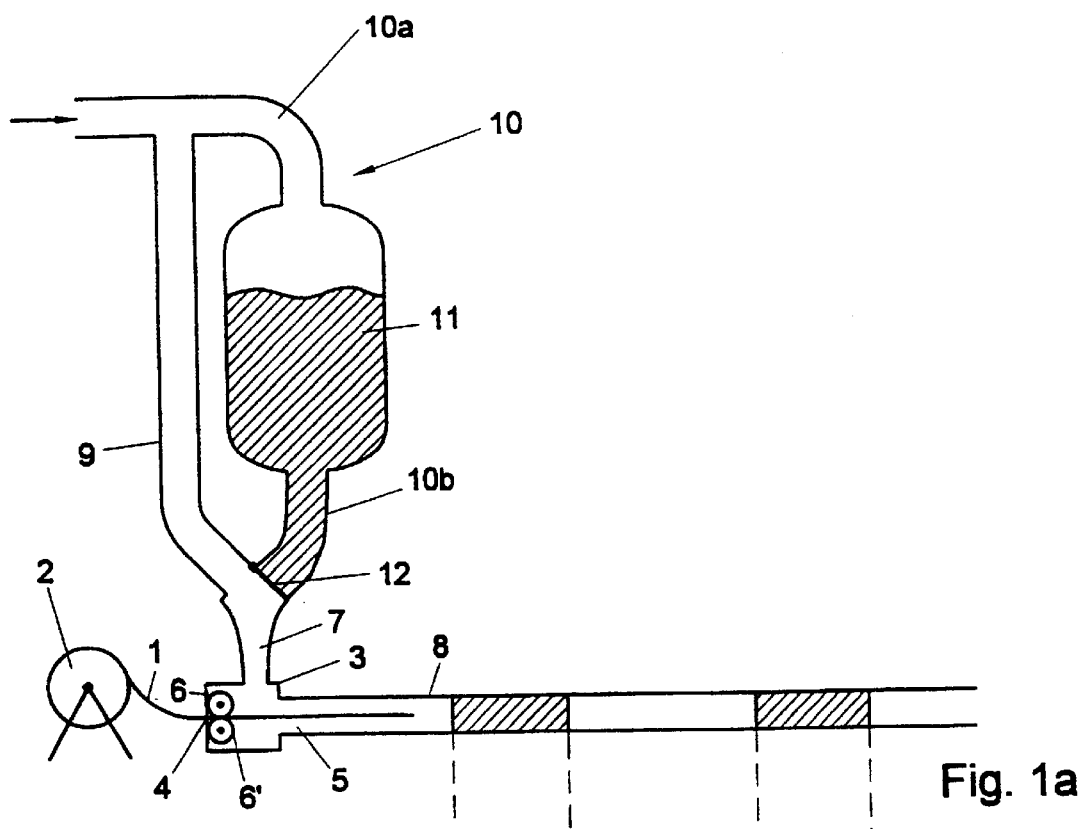
FIG. 1a is a schematic view of an apparatus suitable for practicing the method according to the invention.

In the apparatus according to FIG. 1a, a cable 1 is supplied from a cable reel 2 to a feeder unit 3. This feeder unit may be of the type described in EP-A-0 292 037 and which is provided with a feed-in opening 4, a feed-out opening 5, at least one pair of pressure rollers 6, 6', and an opening 7 for supplying a gas stream. For further details, reference is made to the description of the apparatus in the above-mentioned patent application.

The cable 1 is supplied via the feed-in opening 4 to the space between the pressure rollers 6, 6' and transported by these rollers to the feed-out opening 5. Connected to the feed-out opening 5 is the tube 8, in which the cable is to be installed. The fluid can flow via the supply opening 7, feeder unit 3 and the feed-out opening 5 into the tube.

Figure 1B:
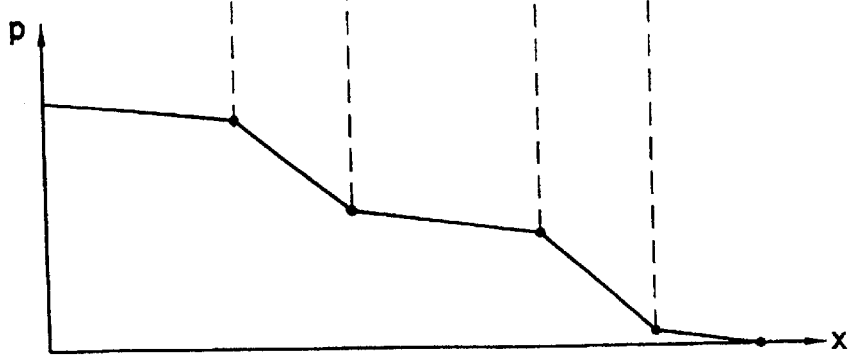

According to the invention, at least two different fluid sources can be connected to the supply opening. According to the exemplary embodiment, gas is supplied from a suitable gas source (not shown), for instance a compressor, through a conduit 9 to the feeder unit 3. Connected parallel to conduit 9 is a conduit 10, which includes a reservoir 11, accommodating a suitable medium, between a conduit section 10a and a conduit section 10b. The section 10a is also in communication with the gas source, and the conduit section 10b leads to the supply opening 7. The conduit section 10b includes a valve 12, which can be moved between a first and a second-position. In the first position, which is shown in the figure, the passage from conduit 10b, and hence the contents of the reservoir 11, to the supply opening 7 is blocked, and gas can flow via conduit 9 to the supply opening 7. In the second position, the passage from the conduit 9 to the supply opening 7 is blocked and liquid can flow via conduit 10b to the supply opening 7. By alternately setting the valve 12 from one position to the other, gas and liquid are alternately supplied to the tube 8. All this is indicated in the figure by blank and hatched sections in the tube 8. In the figure, the second fluid is heavier than the first, as is the case, for instance, for the combination of air and water. FIG. 1b shows the corresponding course of the pressure.

However, there are other possibilities: two identical liquids or gases having alternately different temperatures; two different liquids or gases; or a liquid and a gas. Instead of the arrangement shown in the figure, it is also possible to use two separate supply conduits, each having its own compressor or pump, to suitably supply different media to the tube.

Depending on the diameter of the tube 8, the interfacial surface tension between the two media supplied via the conduits 9 and 10, respectively, and the duration of the time the valve remains in each of the positions, the sections in the tube 8 will remain completely separate for a longer or shorter time. In general, a long time duration is favorable for each of the valve positions, and also favorable is a tube diameter such that it is not much greater than the diameter of a hanging drop of the heavier of the two media in the other medium. The above-mentioned areas remaining separate is favorable to compensate the influence of the stiffness of the cable in passing through bends.

Even if, at some point in the tube path, the two media mix completely, the invention still yields a synergistic effect by the use of two media instead of a single medium. In the case where, for instance, water and air are supplied as medium, an optimum tuning of the medium to the cable can be obtained when this mixture has approximately the same average density as the cable, whose density is sometimes less than that of water. Such a cable has, for instance, a weight of 0.03 N/m at a diameter of 2.5 mm. This cable is then optimally propelled, while, further, the flow velocity, and hence the installation speed, will be greater than in the case of air alone. Furthermore, the water prevents electric charge from arising on the outside of the cable or the inside of the tube, and hence prevents the cable adhering to the tube wall.

The invention provides advantages not only in the installation of thin cables in tubes of a small diameter, but also in the case of greater tube and cable diameters.

If, in installing a cable in a tube, a liquid rather than a gas is used, which may be desirable, for instance, if gas does not have sufficient capacity to maintain a flow, or if it is desired to utilize the buoyant force of a liquid, there will no longer be a linear pressure drop involved, as with gases, because liquid is not compressible. The synergistic effect of the combination of pushing and blowing, as described in EP-A-0 292 037, is then lost. However, by now mixing a gas with the liquid in accordance with the invention, this effect can be obtained again.

Another example is installing a cable in a tube wound on a reel. It is then desirable that the drag forces be linearly distributed over the length of the tube. To that end, as media, two liquids of different viscosities can be used advantageously. One option would be a water stream to which grated ice is periodically added. The viscosity of the medium then changes periodically as a result of the addition of a solid substance, in this case the ice, and as a result of the lower temperature of the water/ice mixture with respect to the temperature of the water alone.

If at least one of the fluids introduced into the tube is a liquid, it is possible to further increase the flow velocity thereof, and hence the installation speed, by adding a minor amount of polymer to the liquid or liquids. As is described in the article "Weerstandsvermindering door polymeren: numerieke experimenten" ["Resistance reduction by polymers: numerical experiments"] by J. M. J. den Toonder, in Nederlands Tijdschrift voor Natuurkunde ["Dutch Journal of Physics"] (64/8) 1998, pp. 235–239, the flow resistance of liquid can be greatly reduced by adding a small amount of polymer to the liquid. The addition of, for instance, 0.001% polyethylene oxide or polyacrylamide to water yields a flow resistance reduction of as much as 70%. The resistance reduction occurs only if the flow is turbulent.

The surprisingly favorable effect of the invention on the attainable installation length will now be elucidated in and by two arithmetic examples. In both arithmetic examples, reference is made to Appendices 1–3, included at the end of the description, which substantiate the formulae used in both examples.

EXAMPLE 1

The introduction of an optical fiber into a cabled tube of an inside diameter of 1 mm, an outside diameter of 1.5 mm and a length of 1 km. The pressure difference across the tube is 12 bar. Installing such a fiber finds application, for instance, in a method described in EP-A-0 292 037, in which an optionally branched network of tubes has been pre-installed and the fibers can be installed in these tubes, as desired. In this way, afterwards, an assembly of fibers and tubes can be formed with the properties of a "normal" prefabricated glass fiber cable.

Another application is the removal of a fiber from a part of a tube using a pressurized fluid, to enable this fiber end to be led into another branch.

Use is made of a glass fiber with standard coating: diameter $D_c$ of 250 μm, weight W of 0.00072 N/m, density $\rho_{fiber}$ of 1.5 g/cm$^3$. This means an effective weight $W_f$ in water of 0.00024 N/m and a stiffness B of $10^{-6}$ Nm$^2$ (see Appendix 2). The coefficient of friction $f$ between glass fiber and tube is 0.2. The tubes are cabled with a bend radius $R_b$ of 20 cm.

In accordance with Appendix 1, this gives a flow velocity v of 0.034 m/s and a volume flow $\Phi_v$ of $2.7 \times 10^{-5}$ l/s during installation using water alone. The Reynolds number is 31; the flow is therefore very laminar. This gives a drag force of $1.2 \times 10^{-4}$ N/m. This is well over twice as high as the frictional force $fW_f$, which equals $0.5 \times 10^{-4}$ N/m. Accordingly, the fiber will flow approximately as fast as the water. Installing 1 km, however, takes more than 8 hours. Approximately 0.8 l water is needed for installing, plus the same amount for filling the tube. Leading the fiber through a continuous bend having a bend radius $R_b$ of 20 cm (a cabled, tube) requires a force of $1.25 \times 10^{-4}$ N, as follows from the stiffness B of the fiber, using Appendix 3. This is greater than the right-hand part of formula (1) from that Appendix, which part equals $1.04 \times 10^{-4}$ N. The fiber gets stuck.

If, according to the invention, the volume flow is divided into 1 part of water and 2 parts of air, the average value for $W_f$ can be calculated to be 0.00056 N/m. The water pulses thus formed are now, for one-third of the time, three times as "powerful" as in the situation with water alone. The force of the water pulses, if they are long enough, is sufficient to pass the head of the fiber through the bend. The right-hand part of formula (1) from Appendix 3 equals $3.4 \times 10^{-4}$ N at a pulse length of 1 m. This is much more than the required $1.25 \times 10^{-4}$ N. From formula (2) of Appendix 3 follows a minimum pulse length of 59 cm. A pulse length of 1 m is amply sufficient. On the other hand, the pulses should not be too long, so that the drag force at the water pulses can reach, through the bend, the parts without water. In this case, the pulse length should not be greater than a few meters. The duration of installation and the required amount of water also decrease by a factor of 3.

For comparison: in the case of installation with air alone, owing to the absence of the floating action and owing to the non-linear pressure gradient, installation could be effected over just 420 m.

EXAMPLE 2

In this example, a copper quad cable is installed in a tube of an inside diameter of 5.5 mm, an outside diameter of 7 mm and a length of 500 m. The pressure difference across the tube is 10 bar. This example finds application both in installing cables in a tube network already present, and in installing a cable in a tube wound on a reel.

The tube diameter $D_d$ is 5.5 mm and the diameter $D_c$ of the cable is 4.2 mm, the weight W is 0.2 N/m, the density $\rho_{quad}$ is 1.5 g/cm$^3$. The effective weight $W_f$ in water is then 0.07 N/m and the stiffness B is 0.005 Nm$^2$ (see Appendix 2). The coefficient of friction $f$ between cable and tube is 0.2.

In installing the cable using water alone, the effect of filling the tube with the quad cable is so high that calculations are based on a hydraulic diameter of 5.5−4.2=1.3 mm (see Appendix 1). It can be calculated that the flow velocity v is 0.1 m/s and that the volume flow $\Phi_v$ is 0.001 l/s. The Reynolds number is 30, hence the flow is very laminar. The drag force is 0.03 N/m. This is well over twice as high as the frictional force $fW_f$, which equals 0.014 N/m. The cable will flow in just a bit slower than the water. The installation of 500 m takes a good hour and a half, and 5 l water are needed for installation, plus another 5 liters for filling the tube.

To pass the quad cable through a loose bend of a bend radius $R_b$ of 27 cm, a force of 0.28 N is required, as follows from the stiffness B of the fiber, using Appendix 3. This is much less than the right-hand part of formula (1) from Appendix 3, which now equals 3.9 N (now with an $R_b$ of the windings, at an A of 5 cm and a P of 6 m equaling 29 m), so that the effect of the stiffness in the bend is negligible.

To pass the quad cable through a continuous bend of an $R_b$ of 50 cm (for instance on a reel), a force of 0.12 N is required. This is greater than the right-hand part of formula (1) from Appendix 3, which now equals 0.07 N. The cable gets stuck. Here, too, pulses of water can provide a solution again. The ratios of the numbers are as in Example 1. A water pulse that is twice as short as the air pulse provides the solution here, too. The pulse can now be slightly longer because of the greater bend radius $R_b$. The duration of installation and the required amount of water again decrease by a factor of 3.

For comparison: using air alone in combination with pushing, installing could proceed over just 343 m. The starting point was a tube with a bend having a bend radius of 27 cm over 200 m. When the quad cable is installed on a reel, the length that can be installed is even less.

Appendix 1: Flow Through a Tube

The flow through a tube is characterized by the Reynolds number:

$$Re = \frac{\rho v D_h}{\mu}$$

where v is the average velocity, $\rho$ is the density (1.3 kg/m$^3$ for air, 10$^3$ kg/m$^3$ for water), $\mu$ is the dynamic viscosity ($1.8 \times 10^{-5}$ Pas for air and $1.1 \times 10^{-3}$ Pas for water) of the flowing medium, and $D_h$ is the hydraulic diameter. This last parameter is equal to the inside diameter $D_d$ of the tube and, for a tube filled with cable of a diameter $D_c$, equals $D_d$−$D_c$. For a Reynolds number less than 2000, the flow is laminar, otherwise it is turbulent. However, a hysteresis effect occurs. If from a laminar condition, the turbulent condition is achieved, the speed falls off at the same pressure across the tube. The pressure will then have to be reduced first before a laminar flow is obtained again.

At a pressure gradient dp/dx across the tube, the average velocity v can be derived, with:

$$\frac{dp}{dx} = -C_d \frac{\rho v^2}{2D_h}$$

The drag coefficient $C_d$ follows from Re:

$$C_d = \frac{64}{Re}$$

therefore $$\frac{dp}{dx} = -\frac{32 \mu v}{D_h^2}$$

for laminar flow $$C_d = \frac{0{,}31}{Re^{1/4}}$$

therefore $$\frac{dp}{dx} = -\frac{0{,}155 \mu^{1/4} \rho^{3/4} v^{7/4}}{D_h^{5/4}}$$

for turbulent flow
From this, the volume flow $\Phi_v$ can be derived, with $\Phi_v = v \pi D_d^2 / 4$ for a tube without cable and $\Phi_v = v \pi (D_d^2 - D_c^2)/4$ for a tube filled with a cable. The pressure gradient in the tube is linear for liquid streams and non-linear for (compressible) gas streams:

$$\frac{dp}{dx} = \frac{(1 - p_a^2/p_i^2) p_i}{2l \sqrt{1 - (1 - p_a^2/p_i^2) x/l}}$$

for gas flow
where:

$p_a$=atmospheric pressure
$p_i$=pressure at inlet of the tube
l=length of the tube the pressure gradient in the tube results in a force $F_{bl}$ on the cable present therein; it can be split up into two components: the hydrostatic $F_{hs}$ and the hydrodynamic $F_{hd}$. It follows for turbulent flow that:

$$\frac{dF_{hs}}{dx} = \frac{\pi}{4}D_c^2\frac{dp}{dx} \text{ and } \frac{dF_{hd}}{dx} = \frac{\pi}{4}D_c(D_d - D_c)\frac{dp}{dx},$$

therefore, overall:

$$\frac{dF_{bl}}{dx} = \frac{\pi}{4}D_cD_d\frac{dp}{dx}$$

For the hydrodynamic component, it is assumed, for turbulent flow, that the velocity is constant over the entire tube cross section (except for the laminar boundary layer) and the forces are evenly distributed over the surfaces of the tube and the cable. With laminar flow, this is not the case. The velocity is highest in the middle, decreasing towards the walls (of cable and tube). Accordingly, the liquid will have less effect on the part of the cable close to the tube wall. In a "worst case" assumption (is approximated with relatively small cables with respect to the tube), only the projection of the cable on the tube wall counts as effective surface. Accordingly, this costs a factor $\pi$ in drag force. Overall, it follows for laminar flow that:

$$\frac{dF_{bl}}{dx} = \frac{\pi}{4}\left[D_c^2 + \frac{1}{\pi}D_c(D_d - D_c)\right]\frac{dp}{dx}$$

The fact that an alternation of flowing media of different viscosities results in different pressure gradients can be explained on the basis of an example with two liquids in the laminar condition. For other situations, the same conclusion can be drawn by analogy. If two liquids having viscosities $\mu_1$ and $\mu_2$ flow, one after the other, into the same tube (of constant diameter), their velocities v are also the same. From the formula for pressure gradient dp/dx for laminar flow, it then follows that the pressure gradients have exactly the same ratio as the viscosities $\mu_1$ and $\mu_2$. For turbulent flow, a difference in density also results in a difference in pressure gradient; this is not the case with laminar flow.

Appendix 2: A Standard Coated Glass Fiber

The glass in a glass fiber consists of quartz glass having a density ρ of 2.4 g/cm³ and a Young's modulus E of 72 Gpa. The glass portion of the fiber has a diameter of 125 μm. Around it, there is a first layer of (soft) coating of uv-acrylate, having a density ρ of 1.3 g/cm³ and a Young's modulus E of 0.005 Gpa, to a diameter of 187.5 μm. Around that, finally, is an outer layer of hard coating of uv-acrylate of a density ρ of 1.3 g/cm³ and a Young's modulus E of 0.5 Gpa, to a diameter of 250 μm.

Overall, the glass fiber therefore has a density ρ of 1.5 g/cm³, as was also found by direct weight measurements.

The stiffness B of a cylinder having an outside diameter $D_2$ and an inside diameter $D_1$ follows from:

$$B = E\frac{\pi}{64}(D_2^4 - D_1^4)$$

It follows that, overall, the glass fiber has a stiffness B of a value slightly less than $10^{-6}$ Nm².

Appendix 3: The Effect of the Stiffness

The stiffness of a cable first presents problems at the head of the cable when passing through a bend. The force $F_{head}$ that is needed to pass a cable through a single bend follows from:

$$F_{head} = \frac{3Bf}{\sqrt{6(D_d - D_c)R_b^3}} + \frac{B}{2R_b^2}$$

In the case where the bend is continuous, as in a tube on a reel, the last term is even twice as great:

$$F_{head} = \frac{3Bf}{\sqrt{6(D_d - D_c)R_b^3}} + \frac{B}{R_b^2}$$

In order not to allow the force $F_{head}$ that is needed to push the cable head through the bend, to build up to a still greater pushing force, it is necessary that, at that cable head, over a certain length, the drag force of the flowing medium is amply greater than the frictional force. The increase of the pushing force dF is given by reducing the frictional force from formula (2.11) from the book "Installation of optical cables in ducts" by W. Griffioen, Plumettaz, Bex (CH), 1993, by the drag force $dF_{bl}$, using the fact that $dx=R_b d\theta$:

$$dF = \left[f\sqrt{W_f^2 + \left(\frac{F}{R_b}\right)^2} - \frac{dF_{bl}}{dx}\right]dx$$

This formula is in fact a simplified version of formula (5.24) from the book cited. To decrease the pushing force F, it is therefore required that:

$$F_{head} \ll R_b\sqrt{\left(\frac{1}{f}\frac{dF_{bl}}{dx}\right)^2 - W_f^2} \quad (1)$$

The minimum length $l_{min}$ over which the above-mentioned condition must apply, is calculated in a worst case approximation by integrating over x the difference between the drag force and frictional force at pushing force $F_{head}$, which gives:

$$l_{min} \geq \frac{F_{head}}{\frac{dF_{bl}}{dx} - f\sqrt{W_f^2 + \left(\frac{F_{head}}{R_b}\right)^2}} \quad (2)$$

In the foregoing, $R_b$ can be the same as for the bend through which the cable is led (when installed on a reel) or be determined by windings in the path. In that case, $R_b$ is to be defined as:

$$R_b = \frac{P^2}{8\pi A}$$

where:

P=period of windings in the path

A=amplitude of the windings.

What is claimed is:

1. A method for installing a cable in a tube, comprising: applying a pushing force to the cable; and
alternately passing a first pressurized fluid having first hydrodynamic properties and a second pressurized fluid having second hydrodynamic properties into the tube at substantially a same location.

2. A method according to claim 1, wherein the first fluid comprises a gas of a first viscosity and the second fluid comprises a gas of a second viscosity.

3. A method according to claim 1, wherein the first fluid comprises a liquid of a first viscosity and the second fluid comprises a liquid of a second viscosity.

4. A method according to claim 3, wherein at least one of the liquids of the first and second fluids is electrically conductive.

5. A method according to claim 4, wherein a small amount of polymer is added to the liquid of the second fluid to reduce a flow resistance thereof.

6. A method according to claim 3, wherein a small amount of polymer is added to at least one of the liquids of the first and second fluids to reduce a flow resistance thereof.

7. A method according to claim 1, wherein the first fluid comprises a gas of a first temperature and the second fluid comprises a gas of a second temperature.

8. A method according to claim 1, wherein the first fluid comprises a gas of a first temperature and the second fluid comprises a gas of a second temperature.

9. A method according to claim 1, wherein the first fluid comprises a liquid of a first density and the second fluid comprises a liquid of a second density.

10. A method according to claim 1, wherein the first fluid comprises a liquid of a first temperature and the second fluid comprises a liquid of a second temperature.

11. A method according to claim 1, wherein the first fluid and the second fluid are passed into the tube as alternate pulses.

12. A method for installing a cable in a tube, comprising: applying a pushing force to the cable; and
passing a first pressurized fluid having first hydrodynamic properties and a second pressurized fluid having second hydrodynamic properties into the tube at different timings;
wherein the first fluid comprises a liquid and the second fluid comprises a mixture of a liquid and a solid substance.

13. A method according to claim 12, wherein the first fluid comprises water and the second fluid comprises a mixture of water and ice.

14. A method according to claim 13, wherein at least one of the first and second fluids is electrically conductive.

15. A method according to claim 14, wherein a small amount of polymer is added to the liquid of the second fluid to reduce a flow resistance thereof.

16. A method according to claim 13, wherein a small amount of polymer is added to at least one of the first and second fluids to reduce a flow resistance thereof.

17. A method according to claim 12, wherein at least one of the liquids of the first and second fluids is electrically conductive.

18. A method according to claim 17, wherein a small amount of polymer is added to the liquid of the second fluid to reduce a flow resistance thereof.

19. A method according to claim 12, wherein a small amount of polymer is added to at least one of the liquids of the first and second fluids to reduce a flow resistance thereof.

20. A method according to claim 12, wherein the first fluid and the second fluid are passed into the tube as alternate pulses.

21. A method for installing a cable in a tube, comprising: applying a pushing force to the cable; and
passing a first pressurized fluid having first hydrodynamic properties and a second pressurized fluid having second hydrodynamic properties into the tube at different timings;
wherein the first fluid comprises a gas stream and the second fluid comprises a liquid.

22. A method according to claim 21, wherein the liquid is electrically conductive.

23. A method according to claim 22, wherein a small amount of polymer is added to the liquid of the second fluid to reduce a flow resistance thereof.

24. A method according to claim 21, wherein a small amount of polymer is added to the liquid of the second fluid to reduce a flow resistance thereof.

25. A method according to claim 21, wherein the first fluid and the second fluid are passed into the tube as alternate pulses.

26. An apparatus for installing a cable in a tube, comprising:
a feeder unit including: (i) a feed-in opening into which an end of the cable is fed, (ii) a feed-out opening to which the tube can be connected, (iii) transport means for engaging the cable and transporting the cable from the feed-in opening to the feed-out opening and into the tube, and (iv) a fluid supply opening; and
means for alternately supplying a first fluid having first hydrodynamic properties and a second fluid having second hydrodynamic properties into the supply opening and via the feeder unit into the tube.

27. An apparatus according to claim 26, wherein the means for alternately supplying the first fluid and the second fluid comprises:
a first fluid source;
a first fluid conduit leading from the first fluid source to the supply opening of the feeder unit;
a second fluid source;
a second fluid conduit leading from the second fluid source to the supply opening of the feeder unit;
and a valve.

28. An apparatus according to claim 27, wherein the valve is adapted to move between a first position in which a passage from the first fluid conduit to the supply opening is blocked, and a second position in which a passage from the second fluid conduit to the supply opening is blocked.

* * * * *